United States Patent [19]
Spencer

[11] Patent Number: 6,090,186
[45] Date of Patent: Jul. 18, 2000

[54] METHODS OF SELECTIVELY SEPARATING $CO_2$ FROM A MULTICOMPONENT GASEOUS STREAM

[76] Inventor: Dwain F. Spencer, 24 Fairway Pl., Half Moon Bay, Calif. 94019

[21] Appl. No.: 09/067,937

[22] Filed: Apr. 28, 1998

Related U.S. Application Data

[63] Continuation-in-part of application No. 08/923,172, Sep. 4, 1997, abandoned, which is a continuation of application No. 08/643,151, Apr. 30, 1996, Pat. No. 5,700,311.

[51] Int. Cl.[7] ................................................. B01D 53/78
[52] U.S. Cl. ........................... 95/236; 48/198.3; 423/220; 423/437.1; 585/15
[58] Field of Search ............................. 95/149, 153, 236, 95/193, 194, 227, 228; 96/242; 585/15; 423/220, 437.1; 422/243; 48/127.3, 127.5, 198.3, 197 R, 197 FM, 198.7, 190

[56] References Cited

U.S. PATENT DOCUMENTS

| | | | |
|---|---|---|---|
| 3,150,942 | 9/1964 | Vasan | 95/115 |
| 3,359,744 | 12/1967 | Bolez et al. | 62/632 |
| 3,479,298 | 11/1969 | Sze et al. | 48/198.7 |
| 3,838,553 | 10/1974 | Doherty | 95/98 |
| 4,235,607 | 11/1980 | Kinder et al. | 95/236 X |
| 4,861,351 | 8/1989 | Nicholas et al. | 95/93 |
| 5,397,553 | 3/1995 | Spencer | 48/190 X |
| 5,434,330 | 7/1995 | Hnatow et al. | 95/149 X |
| 5,562,891 | 10/1996 | Spencer et al. | 62/53.1 X |
| 5,600,044 | 2/1997 | Colle et al. | 95/153 X |
| 5,700,311 | 12/1997 | Spencer | 95/236 |

FOREIGN PATENT DOCUMENTS 3-164419  7/1991  Japan .

OTHER PUBLICATIONS

Austvik, T. et al., "Deposition Of $CO_2$ On The Seabed In The Form Of Hydrates," *Energy Convers. Mgmt.* (1992) vol. 33, No. (5–8):659–666.

Golomb, D.S. et al., "The Fate of $CO_2$ Sequestered In The Deep Ocean," *Energy Convers. Mgmt.* (1992) vol. 33, No. (5–8):675–683.

Nishikawa, Nobuyuki et al., "$CO_2$ Clathrate Formation and its Properties in the Simulated Deep Ocean," *Energy Convers. Mgmt.* (1992) vol. 33, No. (5–8):651–657.

Saji, A. et al., "Fixation of Carbon Dioxide By Clathrate–Hydrate," *Energy Convers, Mgmt.* (1992) vol. 33, No. (5–8):643–649.

Spencer, D.F., "A Preliminary Assessment of Carbon Dioxide Mitigation Options," *Annu. Rev. Energy Enviorn.* (1991) vol. 16:259–73.

Spencer & White, "Innovative CO2 Separation and Sequestration Processes for Treating Multicomponent Gas Streams," freely distributed by authors prior to filing date but after Apr. 28, 1997.

*Primary Examiner*—Richard L. Chiesa
*Attorney, Agent, or Firm*—Bozicevic, Field & Francis; Bret Field

[57] ABSTRACT

Methods are provided for the selective removal of $CO_2$ from a multicomponent gaseous stream to provide a $CO_2$ depleted gaseous stream having at least a reduction in the concentration of $CO_2$ relative to the untreated multicomponent gaseous stream. In the subject methods, the multicomponent gaseous stream is contacted with $CO_2$ nucleated water under conditions of selective $CO_2$ clathrate formation, where the $CO_2$ nucleated water serves as liquid solvent to produce a $CO_2$ clathrate slurry and $CO_2$ depleted gaseous stream. In a preferred embodiment, the $CO_2$ clathrate slurry is then decomposed to produce $CO_2$ gas and nucleated water. The subject methods find use in a variety of applications where it is desired to selectively remove $CO_2$ from a multicomponent gaseous stream, including chemical feedstock processing applications and air emissions control applications.

11 Claims, 4 Drawing Sheets

METHODS OF SELECTIVELY SEPARATING CO₂ FROM A MULTICOMPONENT GASEOUS STREAM

CROSS REFERENCE TO RELATED APPLICATIONS

This application is a continuation in part of application Ser. No. 08/923,172, filed on Sep. 4, 1997 now amended, which application is a continuation of application Ser. No. 08/643,151 filed on Apr. 30, 1996, now U.S. Pat. No. 5,700,311, the disclosures of which are herein incorporated by reference.

INTRODUCTION

1. Field of the Invention

The field of this invention is selective absorption of $CO_2$ gas.

2. Introduction

In many applications where mixtures of two or more gaseous components are present it is often desirable to selectively remove one or more of the component gases from the gaseous stream. Of increasing interest in a variety of industrial applications, including power generation and chemical synthesis, is the selective removal of $CO_2$ from multicomponent gaseous streams.

An example of where selective $CO_2$ removal from a multicomponent gaseous stream is desirable is the processing of synthesis gas or syngas. Syngas is a mixture of hydrogen, carbon monoxide and $CO_2$ that is readily produced from fossil fuels and finds use both as a fuel and as a chemical feedstock. In many applications involving syngas, the carbon monoxide is converted to hydrogen and additional $CO_2$ via the water-gas shift process. It is then often desirable to separate the $CO_2$ from the hydrogen to obtain a pure $H_2$ stream for subsequent use, e.g. as a fuel or feedstock.

As man made $CO_2$ is increasingly viewed as a pollutant, another area in which it is desirable to separate $CO_2$ from a multicomponent gaseous stream is in the area of pollution control. Emissions from industrial facilities, such as manufacturing and power generation facilities, often comprise $CO_2$. In such instances, it is often desirable to at least reduce the $CO_2$ concentration of the emissions. The $CO_2$ may be removed prior to combustion in some cases and post combustion in others.

A variety of processes have been developed for removing or isolating a particular gaseous component from a multicomponent gaseous stream. These processes include cryogenic fractionation, selective adsorption by solid adsorbents, gas absorption, and the like. In gas absorption processes, solute gases are separated from gaseous mixtures by transport into a liquid solvent. In such processes, the liquid solvent ideally offers specific or selective solubility for the solute gas or gases to be separated.

Gas absorption finds widespread use in the separation of $CO_2$ from multicomponent gaseous streams. In $CO_2$ gas absorption processes that currently find use, the following steps are employed: (1) absorption of $CO_2$ from the gaseous stream by a host solvent, e.g. monoethanolamine; (2) removal of $CO_2$ from the host solvent, e.g. by steam stripping; and (3) compression of the stripped $CO_2$ for disposal, e.g. by sequestration through deposition in the deep ocean or ground aquifers.

Although these processes have proved successful for the selective removal of $CO_2$ from a multicomponent gaseous stream, they are energy intensive. For example, using the above processes employing monoethanolamine as the selective absorbent solvent to remove $CO_2$ from effluent flue gas generated by a power plant often requires 25 to 30% of the available energy generated by the plant. In most situations, this energy requirement, as well as the additional cost for removing the $CO_2$ from the flue gas, is prohibitive.

Accordingly, there is continued interest in the development of less energy intensive processes for the selective removal of $CO_2$ from multicomponent gaseous streams. Ideally, alternative $CO_2$ removal processes should be simple, require inexpensive materials and low energy inputs. For applications in which it is desired to effectively sequester the separated $CO_2$, of particular interest would be the development of alternative $CO_2$ absorbent solvents from which the absorbed $CO_2$ would not have to be subsequently stripped prior to sequestration. Of particular interest would be the development of a system which minimizes parasitic energy losses.

3. Relevant Literature

Patents disclosing methods of selectively removing one or more components from a multicomponent gaseous stream include: U.S. Pat. Nos. 3,150,942; 3,838,553; 3,359,744; 3,479,298; 4,253,607; 4,861,351; 5,387,553; 5,434,330; 5,562,891 and 5,600,044.

Reports summarizing currently available processes for reducing the $CO_2$ content of mult-component gaseous streams, such as coal fired power plant emissions, include: Smelser, S. C. et al., "Engineering and Economic Evaluation of $CO_2$ Removal From Fossil-Fuel-Fired Powerplants, Vol. 1: Pulverized -Coal-Fired Powerplants," EPRI IE-7365 Vol. 1 and Vol. 2; Coal Gasification-Combined Cycle Power Plants, EPRI IE-7365, Vol. 2.

Other publications discussing $CO_2$ clathrate formation include Japanese unexamined patent application 3-164419, Nishikawa et al., "$CO_2$ Clathrate Formation and its Properties in the Simulated Deep Ocean," Energy Convers. Mgmt. (1992) 33: 651–657; Saji et al., "Fixation of Carbon Dioxide by Clathrate-Hyrdrate," Energy Convers. Mgmt. (1992) 33: 643–649; Austvik & Løken, "Deposition of $CO_2$ on the Seabed in the Form of Clathrates, " Energy Convers. Mgmt. (1992) 33: 659–666; Golumb et al., "The Fate of $CO_2$ Sequestered in the Deep Ocean," Energy Convers. Mgmt. (1992) 33: 675–683; Spencer, "A Preliminary Assessment of Carbon Dioxide Mitigation Options," Annu. Rev. Energy Environ. (1991) 16: 259–273; Spener & North, "Ocean Systems for Managing the Global Carbon Cycle," Energy Convers. Mgmt. (1997) 38 Suppl.: 265–272; and Spencer & White, "Sequestration Processes for Treating Multicomponent Gas Streams," Proceedings of $23^{rd}$ Coal and Fuel Systems Conference, Clearwater, Fla. (March 1998).

SUMMARY OF THE INVENTION

Methods are provided for the selective removal of $CO_2$ from a multicomponent gaseous stream. In the subject methods, a multicomponent gaseous stream comprising $CO_2$ is contacted with $CO_2$ nucleated water under conditions of selective $CO_2$ clathrate formation, conveniently in a reactor. The $CO_2$ nucleated water may either be formed in situ in the reactor or in a separate reactor, where the water may be fresh or salt water. Once the $CO_2$ nucleated water is formed, it serves as a selective $CO_2$ liquid solvent. Upon contact of the gaseous stream with the $CO_2$ nucleated water, $CO_2$ is selectively absorbed from the gaseous stream by the $CO_2$ nucleated water and concomitantly fixed as $CO_2$ clathrates to produce a $CO_2$ depleted multicomponent gaseous stream and a slurry of $CO_2$ clathrates. The resultant $CO_2$ depleted multicomponent gaseous stream is then separated from the $CO_2$ clathrate slurry, either in the reactor itself or in a downstream separator. In a preferred embodiment, the resultant slurry is then treated in a manner sufficient to decompose the $CO_2$ hydrates to produce $CO_2$ gas and $CO_2$ nucleated water. The process is suitable for use with a wide variety of multicomponent gaseous streams.

DETAILED DESCRIPTION OF THE INVENTION

Methods for selectively removing $CO_2$ from a multicomponent gaseous stream are provided. In the subject methods, a multicomponent gaseous stream is contacted with $CO_2$ nucleated water under conditions of selective $CO_2$ clathrate formation, conveniently in a reactor. The $CO_2$ nucleated water may be prepared in situ in the reactor, or in a separate reactor, where the water may be either fresh or salt water. Upon contact of the gaseous stream with the $CO_2$ nucleated water, $CO_2$ is selectively absorbed from the gaseous stream by the $CO_2$ nucleated water and concomitantly fixed in the form of the $CO_2$ clathrates. Contact results in the production of a $CO_2$ depleted gaseous stream and a slurry of $CO_2$ clathrates, which are then separated. In a preferred embodiment, the $CO_2$ clathrate or hydrate slurry is treated to decompose the $CO_2$ hydrates to produce $CO_2$ gas and $CO_2$ nucleated water. The subject invention finds use in the treatment of a variety of multicomponent gaseous streams.

Before the subject invention is further described, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Critical to the subject invention is the use of $CO_2$ nucleated water as a liquid solvent to selectively absorb the gaseous $CO_2$ from the multicomponent gas phase stream. The $CO_2$ nucleated water employed in the subject invention comprises dissolved $CO_2$ in the form of $CO_2$ hydrate or clathrate precursors, where the precursors are in metastable form. The mole fraction of $CO_2$ in the $CO_2$ nucleated water ranges from about 0.01 to 0.04, usually from about 0.02 to 0.04, more usually from about 0.03 to 0.04 The temperature of the $CO_2$ nucleated water will typically range from about $-1.5$ to $10°$ C., preferably from about $-1.5$ to $5°$ C., and more preferably from about $-1.5$ to $0°$ C.

$CO_2$ nucleated water employed in the subject methods as the selective liquid solvent may be prepared using any convenient means. One convenient means of obtaining $CO_2$ nucleated water is described in U.S. Application Ser. No. 08/291,593, filed Aug. 16, 1994, now U.S. Pat. No. 5,562,891, the disclosure of which is herein incorporated by reference. In this method $CO_2$ is first dissolved in water using any convenient means, e.g. bubbling a stream of $CO_2$ gas through the water, injection of $CO_2$ into the water under conditions of sufficient mixing or agitation to provide for homogeneous dispersion of the $CO_2$ throughout the water, and the like, where the $CO_2$ source that is combined with the water in this first stage may be either in liquid or gaseous phase. Where gaseous $CO_2$ is combined with water to make the $CO_2$ nucleated water, the gaseous $CO_2$ will typically be pressurized, usually to partial pressures ranging between 6 to 100 atm, more usually between about 10 to 30 atm. The $CO_2$ may be derived from any convenient source. In a preferred embodiment, at least a portion of the $CO_2$ is gaseous $CO_2$ obtained from a $CO_2$ hydrate slurry decomposition step, as described in greater detail below. The water in which the $CO_2$ is dissolved may be fresh water or salt water, e.g. sea water. The temperature of the water will generally range from about $-1.5$ to $10°$ C., usually from about $-1.5$ to $5°$ C., more usually from about 0 to $1°$ C.

The water that is used to produce the nucleated water may be obtained from any convenient source, where convenient sources include the deep ocean, deep fresh water aquifers, powerplant cooling ponds, and the like, and cooled to the required reactor conditions. In certain embodiments, the nucleated water may be recycled from a downstream source, such a clathrate slurry heat exchanger/decomposition source (as described in greater detail below) where such recycled nucleated water may be supplemented as necessary with additional water, which water may or may not be newly synthesized nucleated water as described above.

The amount of $CO_2$ which is dissolved in the water will be determined in view of the desired $CO_2$ mole fraction of the $CO_2$ nucleated water to be contacted with the gaseous stream. One means of obtaining $CO_2$ nucleated water having relatively high mole fractions of $CO_2$ is to produce a slurry of $CO_2$ clathrates and then decompose the clathrates by lowering the pressure and/or raising the temperature of the water component of the slurry. Generally, nucleated water having higher mole fractions of $CO_2$ are desired because it more readily accepts $CO_2$ absorption and excludes formation of other hydrate compounds.

The production of $CO_2$ nucleated water may conveniently be carried out in a nucleation reactor. The reactor may be packed with a variety of materials, where particular materials of interest are those which promote the formation of $CO_2$ nucleated water and include: stainless steel rings, carbon steel rings, and the like, to promote gas-liquid contact. To ensure that the optimal temperature is maintained in the nucleation reactor, active coolant means may be employed. Any convenient coolant means may be used, where the coolant means will typically comprise a coolant medium housed in a container which contacts the reactor, preferably with a large surface area of contact, such as coils around and/or within the reactor or at least a portion thereof, such as the lower portion of the reactor. Coolant materials or media of interest include ammonia, HCFCs, and the like, where a particular coolant material of interest is ammonia, where the ammonia is maintained at a temperature of from about 0 to 10° C. The surface of the cooling coils, or a portion thereof, may be coated with a catalyst material, such as an oxide of aluminum, iron, chromium, titanium, and the like, to accelerate $CO_2$ hydrate precursor formation. Additionally, hydrate crystal seeding or a small (1–3 atm) pressure swing may be utilized to enhance hydrate precursor formation.

The first step of the subject method is to contact the multicomponent gaseous stream with $CO_2$ nucleated water under conditions of $CO_2$ clathrate formation, preferably under conditions of selective $CO_2$ clathrate formation. The $CO_2$ nucleated water may be contacted with the gaseous stream using any convenient means. Preferred means of contacting the $CO_2$ nucleated water with the gaseous stream are those means that provide for efficient absorption of the $CO_2$ from the gas through solvation of the gaseous $CO_2$ in the liquid phase $CO_2$ nucleated water. Means that may be employed include concurrent contacting means, i.e. contact between unidirectionally flowing gaseous and liquid phase streams, countercurrent means, i.e. contact between oppositely flowing gaseous and liquid phase streams, and the like. Thus, contact may be accomplished through use of spray, tray, or packed column reactors, and the like, as may be convenient.

Generally, contact between the multicomponent gaseous stream and the nucleated water is carried out in a hydrate or clathrate formation reactor. The reactor may be fabricated from a variety of materials, where particular materials of interest are those which promote the formation of $CO_2$ clathrates or hydrates and include: stainless steel, carbon steel, and the like. The reactor surface, or a portion thereof, may be coated with a catalyst material, such as an oxide of aluminum, iron, chromium, titanium, and the like, to accelerate $CO_2$ hydrate formation. To ensure that the optimal temperature is maintained in the hydrate formation reactor, active coolant means may be employed. Any convenient coolant means may be used, where the coolant means will typically comprise a coolant medium housed in a container which contacts the reactor, preferably with a large surface area of contact, such as coils around or within the reactor or at least a portion thereof, such as the exit plenum of the reactor. Coolant materials or media of interest include ammonia, HCFCs and the like, where a particular coolant material of interest is ammonia, where the ammonia is maintained at a temperature of from about 0 to 10° C. Where the reactor comprises gas injectors as the means for achieving contact to produce clathrates, the reactor may comprise 1 or a plurality of such injectors. In such reactors, the number of injectors will range from 1 to about 20 or more, where multiple injectors provide for more rapid clathrate production.

The clathrate formation conditions under which the gaseous and liquid phase streams are contacted, particularly the temperature and pressure, may vary but will preferably be selected so as to provide for the selective formation of $CO_2$ clathrates, to the exclusion of clathrate formation of other components of the multi-component gaseous stream. Generally, the temperature at which the gaseous and liquid phases are contacted will range from about −1.5 to 10° C., usually from about −1.5 to 5° C., more usually from about 0 to 1° C. The $CO_2$ partial pressure or the total pressure in the reactor will generally be at least about 6 atm, usually at least about 8 atm, and more usually at least about 10 atm, but will generally not exceed 100 atm, and more usually will not exceed 30 atm, where higher pressures are required when higher temperatures are employed, and vice versa.

Upon contact of the gaseous stream with the $CO_2$ nucleated water, $CO_2$ is selectively absorbed from the gaseous stream into the $CO_2$ nucleated water liquid phase. The absorbed $CO_2$ is concomitantly fixed as solid $CO_2$ clathrates in the liquid phase. Contact between the gaseous and liquid phases results in the production of a $CO_2$ depleted multicomponent gaseous stream and a slurry of $CO_2$ clathrates. In the $CO_2$ depleted multicomponent gaseous stream, the $CO_2$ concentration is reduced by at least about 50%, usually by at least about 70%, and more usually by at least about 90%, as compared to the untreated multicomponent gaseous stream. In other words, contact of the multicomponent gaseous stream with the $CO_2$ nucleated water results in at least a decrease in the concentration of the $CO_2$ of the gaseous phase, where the decrease will be at least about 50%, usually at least about 70%, more usually at least about 90%. In some instances the concentration of $CO_2$ in the gaseous phase may be reduced to the level where it does not exceed 1% (v/v), such that the treated gaseous stream is effectively free of $CO_2$ solute gas.

As discussed above, the $CO_2$ absorbed by the $CO_2$ nucleated water is concomitantly fixed in the form of stable $CO_2$ clathrates. Fixation of the $CO_2$ in the form of stable $CO_2$ clathrates results in the conversion of the $CO_2$ nucleated water to a slurry of $CO_2$ clathrates. The slurry of $CO_2$ clathrates produced upon contact of the gaseous stream with the $CO_2$ nucleated water comprises $CO_2$ stably fixed in the form of $CO_2$ clathrates and water. Typical mole fractions of $CO_2$ in stable clathrates are 0.12 to 0.15, as compared to 0.02 to 0.04 in the $CO_2$ nucleated water.

As described above, the $CO_2$ nucleated water that serves as the selective liquid solvent for the $CO_2$ solute gas of the multicomponent gaseous stream is produced by dissolving $CO_2$ in water. As such, in some embodiments of the subject invention, $CO_2$ free water may be contacted with the multicomponent gaseous stream under appropriate conditions to first produce the $CO_2$ nucleated water, where contact will be subsequently maintained to produce the $CO_2$ clathrate slurry. In other words, the separate steps of $CO_2$ nucleated water production and the contact between the gaseous stream and the $CO_2$ nucleated water are combined into one continuous process.

The second step of the subject method is the separation of the treated gaseous phase from the $CO_2$ clathrate slurry. As convenient, the gaseous phase may be separated from the slurry in the reactor or in a downstream gas-liquid separator. Any convenient gas-liquid phase separation means may be employed, where a number of such means are known in the art.

Where it is desired to sequester the $CO_2$ clathrates produced by the subject method, the resultant $CO_2$ clathrate slurry may be disposed of directly as is known in the art, e.g. through placement in gas wells, the deep ocean or freshwater aquifers, and the like, or subsequently processed to separate the clathrates from the remaining nucleated water, where the isolated clathrates may then be disposed of according to methods known in the art and the remaining nucleated water recycled for further use as a selective $CO_2$ absorbent in the subject methods, and the like. Where desired, $CO_2$ can easily be regenerated from the clathrates, e.g. where $CO_2$ is to be a product, using known methods. The resultant $CO_2$ gas may be disposed of by transport to the deep ocean or ground aquifers, or used in a variety of processes, e.g. enhanced oil recovery, coal bed methane recovery, or further processed to form metal carbonates, e.g. $MgCO_3$, for fixation and sequestration.

In a preferred embodiment, the $CO_2$ hydrate slurry is treated in a manner sufficient to decompose the hydrate slurry into $CO_2$ gas and $CO_2$ nucleated water, i.e. it is subjected to a decomposition step. Typically, the $CO_2$ hydrate slurry is thermally treated, e.g. flashed, where by thermally treated is meant that temperature of the $CO_2$ hydrate slurry is raised in sufficient magnitude to decompose the hydrates and produce $CO_2$ gas. One convenient means of thermally treating the $CO_2$ hydrate slurry is in a counterflow heat exchanger, where the heat exchanger comprises a heating medium in a containment means that provides for optimal surface area contact with the clathrate slurry. Any convenient heating medium may be employed, where specific heating media of interest include: ammonia, HCFC's and the like, with ammonia vapor at a temperature ranging from 20 to 40° C. being of particular interest. Preferably, the ammonia vapor is that vapor produced in cooling the nucleation and/or hydrate formation reactors, as described in greater detail in terms of the figures.

A variety of multicomponent gaseous streams are amenable to treatment according to the subject methods. Multicomponent gaseous streams that may be treated according to the subject invention will comprise at least two different gaseous components and may comprise five or more different gaseous components, where at least one of the gaseous components will be $CO_2$, where the other component or components may be one or more of $N_2$, $O_2$, $H_2O$, $CH_4$, $H_2$, CO and the like, as well as one or more trace gases, e.g. $H_2S$. The total pressure of the gas will generally be at least about 5 atm, usually at least about 6 atm and more usually at least about 10 atm. The mole fraction of $CO_2$ in the multicomponent gaseous streams amenable to treatment according to the subject invention will typically range from about 0.05 to 0.65, usually from about .10 to 0.60, more usually from about 0.10 to 0.50. Generally, the partial pressure of $CO_2$ in the multicomponent gaseous stream will be at least about 4 to 6 atm, where in many embodiments the partial pressure of the $CO_2$ will be least about 10 atm and as great as 40 atm. As mentioned above, by controlling the clathrate formation conditions of contact appropriately, contact between the $CO_2$ nucleated water and the gas can be controlled to provide for the selective formation of $CO_2$ clathrates, e.g. through use of highly nucleated water that selectively absorbs $CO_2$ gas, such as nucleated water produced through the introduction of pure $CO_2$ gas into the nucleation reactor. The particular conditions which provide for the best selectivity with a particular gas can readily be determined empirically by those of skill in the art. Particular multicomponent gaseous streams of interest that may be treated according to the subject invention include power plant flue gas, turbo charged boiler product gas, coal gasification product gas, shifted coal gasification product gas, anaerobic digester product gas, wellhead natural gas and the like.

Generally, the partial pressure of each of the components of the multicomponent gaseous medium will be such that $CO_2$ is selectively absorbed by the nucleated water and other components are not. As such, the partial pressure of $CO_2$ in the multicomponent gaseous stream will be sufficiently high and the partial pressure of each of the other components of the multicomponent gaseous stream will be sufficiently low to provide for the desired selective $CO_2$ absorption.

Multicomponent gaseous mediums in which the partial pressures of each of the components are suitable for selective $CO_2$ hydrate formation according to the subject invention may be treated directly without any pretreatment or processing. For those multicomponent gaseous mediums that are not readily suitable for treatment by the subject invention, e.g. in which the partial pressure of $CO_2$ is too low and/or the partial pressure of the other components are too high, may be subjected to a pretreatment or preprocessing step in order to modulate the characteristics of the gaseous medium so that is suitable for treatment by the subject method. Illustrative pretreatment or preprocessing steps include: temperature modulation, e.g. heating or cooling, decompression, incorporation of additional components, e.g. $CO_2$, and the like.

One particular multicomponent gas of interest that may be treated according to the subject invention is natural well head gas, e.g. natural gas comprising one or more lower akyls, such as methane, ethane, butane and the like. Where the gas conditions are appropriate, $CO_2$ may be separated from the gas according to the subject invention directly at the well head site without modification or processing of the gas. For example, if the wellhead gas has a total pressure of approximately 60 to 70 atm, a temperature of 0 to 5° C. and consists substantially of $CO_2$ and methane, where the amount of $CO_2$ present in the gas is greater than about 50 volume %, the wellhead gas can be treated without modification according to the subject invention. Conversely, where the temperature of the well head gas is closer to 10° C., as long as the partial pressure of $CO_2$ in the methane/$CO_2$ mixture is at least 30 atm and the partial pressure of methane is below 60 atm, the wellhead gas can be processed without pretreatment. Where the well head gas conditions are not directly suitable for treatment, the wellhead gas may be processed to make it suitable for treatment as described above, where processing includes temperature modulation, e.g. heating or cooling, decompression, incorporation of additional components, e.g. $CO_2$, and the like. For example, where the concentration of $CO_2$ in the wellhead gas is from about 15 to 50% and the temperature is from 0 to 5° C., the gas stream can be treated by decompressing it in a manner sufficient to maintain the partial pressure of the $CO_2$ component above 10 atm and achieve a partial pressure of methane that is below 20 atm.

For the treatment of a shifted coal gasification product gas, the untreated gas will typically comprise $H_2$, $H_2O$, $CO_2$ and trace gases, where the mole fraction of $CO_2$ will range from about 0.30 to 0.45, and will be at a temperature ranging from about 20 to 30° C. and a pressure ranging from about 20 to 40 atm. The product gas will first be cooled to a temperature ranging from −30 to 0° C. and then contacted with $CO_2$ nucleated water, as described above, to produce $CO_2$ depleted shifted coal gasification product gas and a slurry of $CO_2$ clathrates. The resultant $CO_2$ depleted product gas and $CO_2$ clathrate slurry may then be separated and the product gas used as a fuel or for chemical synthesis. Where the shifted coal gas comprises trace amounts of $H_2S$, $H_2S$ will generally be present in amounts ranging from 0 to 20 mole percent or 0 to 3.6 weight percent. In such cases, the $H_2S$ will either be dissolved in the excess slurry water or will form hydrates along with the $CO_2$ and therefore be separated from the multicomponent gaseous stream, obviating the need for subsequent $H_2S$ removal steps.

Yet another type of multicomponent gas that is particularly suited for treatment according to the subject invention is powerplant gas produced by the use of pure oxygen instead of air in the combustion of organic fuels, such as coal, oil or natural gas. In a preferred embodiment, this powerplant flue gas is compressed to 4 to 20 atm and contacted with $CO_2$ nucleated water. The resultant hydrate slurry is nearly pure and is then pressurized to 100 to 150 atm, which can then be flashed as described above to produce $CO_2$ gas and nucleated water, where the $CO_2$ gas can then be disposed of or utilized, e.g. in coal bed methane recovery or enhanced oil recovery.

Figure 1:
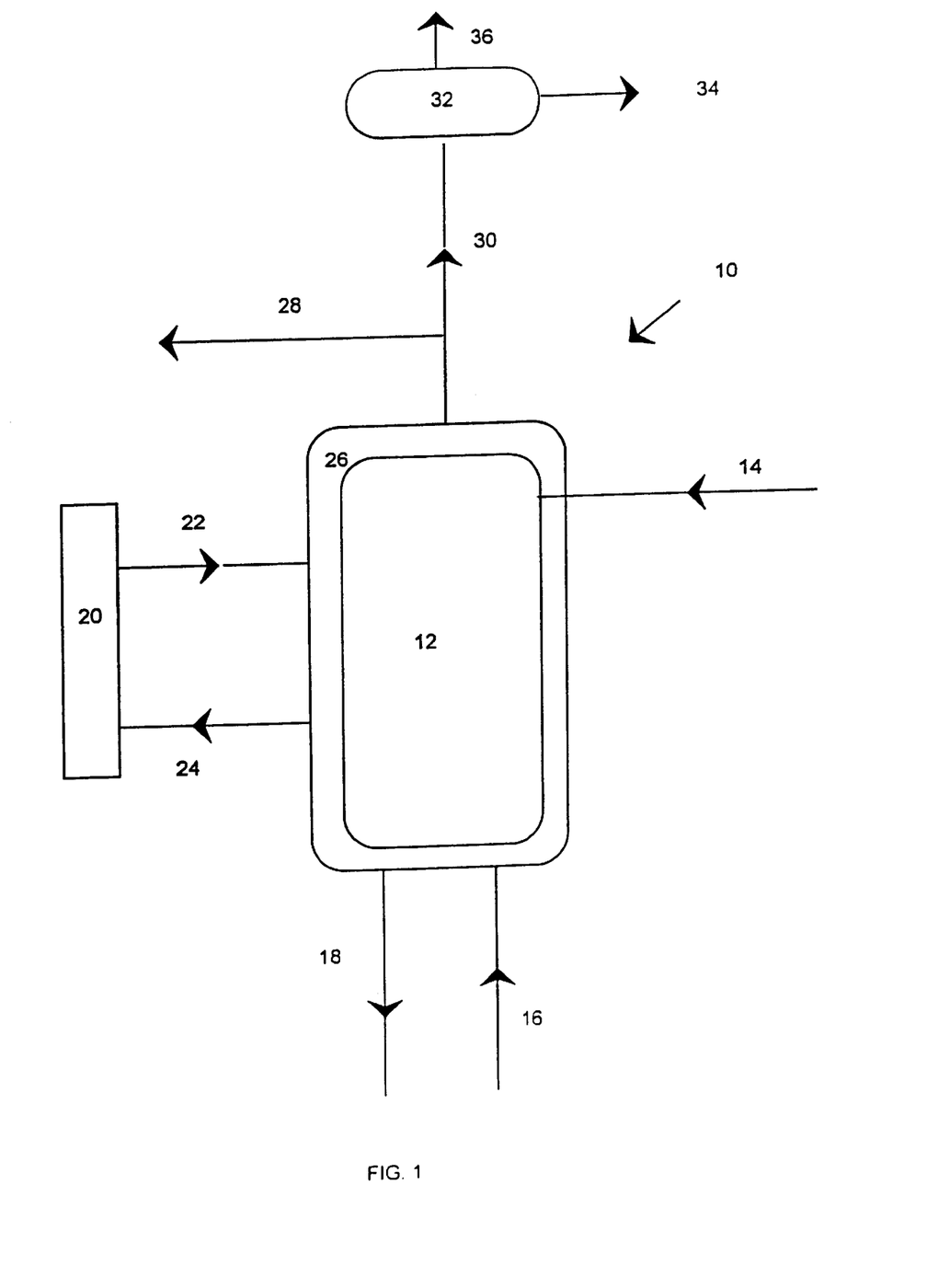
FIG. 1 provides a schematic representation of an embodiment of a countercurrent reactor for practicing the subject invention.

The invention will now be described further in terms of the figures, which provide schematic representations of countercurrent and concurrent reactors for carrying out the subject invention. FIG. 1 provides a schematic representation of an embodiment of a counter current reactor which may be used for carrying out the subject process. Reactor 10 comprises counter current gaseous-liquid phase contact region 12 surrounded by refrigerant chamber 26, which serves to keep the temperature of region 12 suitable for selective $CO_2$ clathrate formation. Multicomponent gaseous stream 16 comprising $CO_2$ enters region 12 where it is contacted with $CO_2$ nucleated water, or non-nucleated water if the the $CO_2$ nucleated water is to be formed in situ, from feed stream 14. The region may have an open structure, i.e. where the nucleated water is sprayed in countercurrent to the gas, a trayed structure or a packed structure, as is known in the art. Fresh refrigerant liquid or coolant medium is introduced into refrigerant chamber 26 by feed stream 22 and spent refrigerant, represented by stream 24, is returned to refrigerant system 20, where it is refreshed and cycled back to chamber 26. Treated gas, represented by stream 30, leaves chamber 12 and may be recycled through line 28 or passed through a liquid, gas phase separator 32 to yield dry product gas, represented by stream 36, and water, represented by stream 34. The resultant slurry of $CO_2$ clathrates and nucleated water, represented by stream 18, may be sequestered using any convenient means, as described above.

Figure 2:
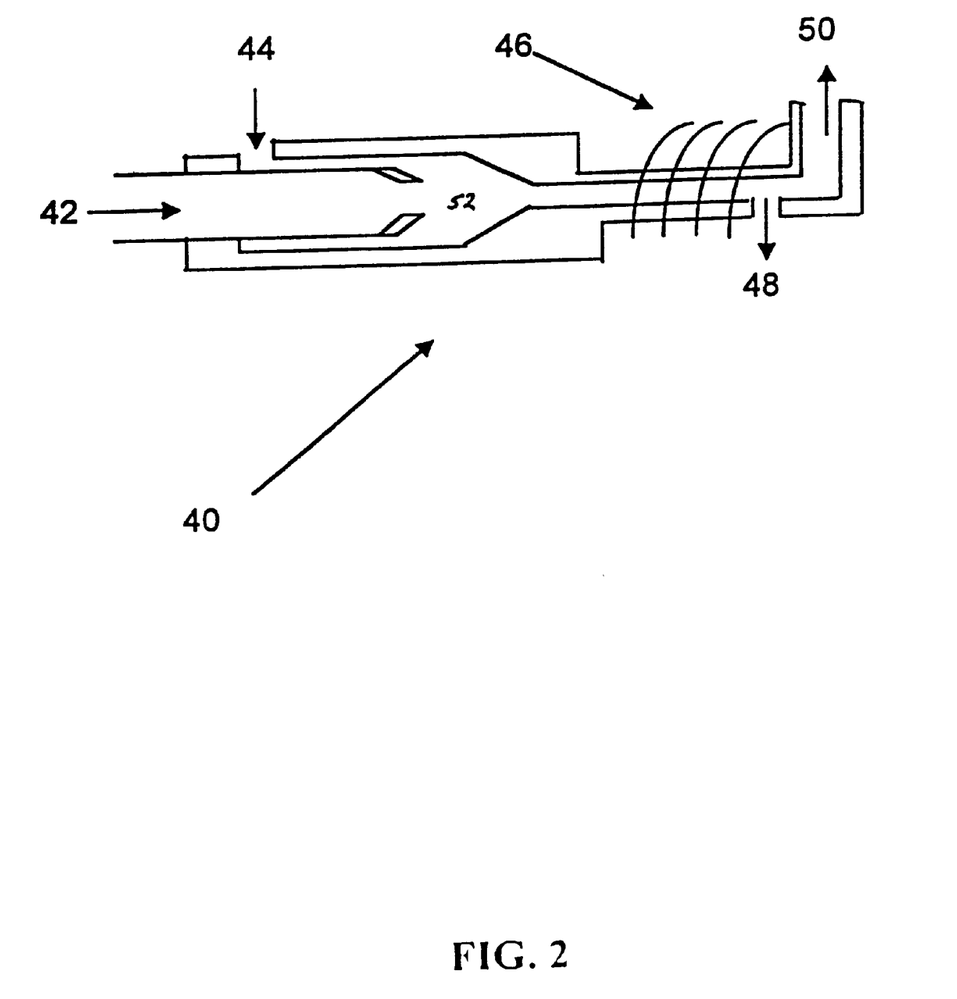
FIG. 2 provides a schematic representation of an embodiment of a concurrent reactor for practicing the subject invention.

FIG. 2 provides a schematic representation of a concurrent reactor for carrying out the subject invention, in which the gaseous stream and liquid phase are contacted in unidirectional flow. With concurrent reactor 40, multicomponent gaseous stream 42 and liquid $CO_2$ nucleated water stream 44 are introduced separately into the reactor and flow to a combination region 52 where they then travel together to a region of selective $CO_2$ clathrate formation cooled by refrigerant coils 46. The resultant slurry of $CO_2$ clathrates, represented by stream 48, is separated from the $CO_2$ depleted gaseous stream 50. The $CO_2$ clathrate slurry 48 may then be sequestered as described above, while the $CO_2$ depleted gaseous stream 50 may be further processed in a liquid-gas phase separator, as described above.

Figure 3:
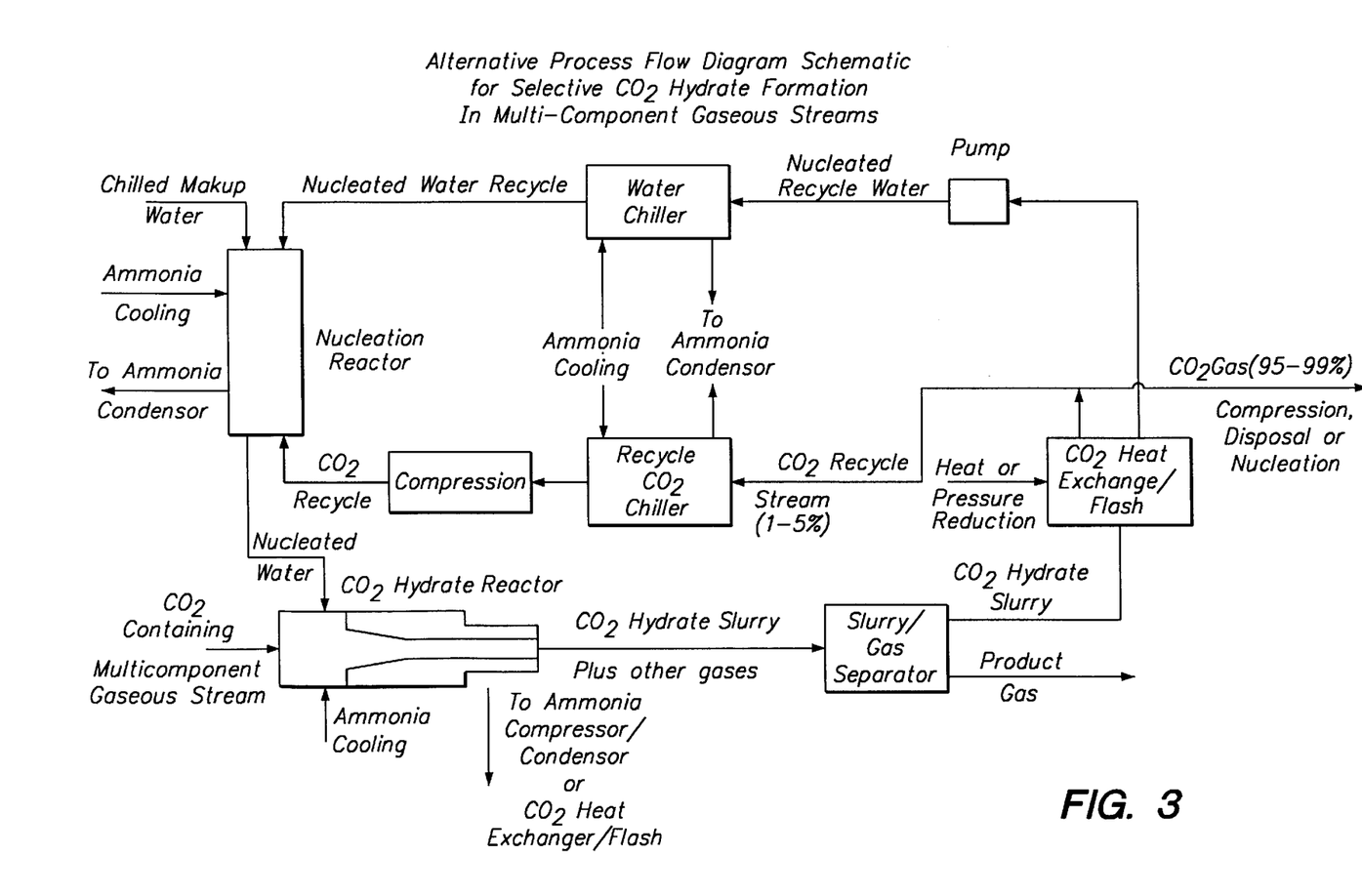
FIG. 3 provides a flow diagram schematic of a preferred embodiment of the subject invention.

FIG. 3 provides a schematic flow diagram of a preferred embodiment of the subject method in which parasitic energy losses are reduced to a minimum. In FIG. 3, the multicomponent gaseous stream and $CO_2$ nucleated water are combined in the $CO_2$ hydrate reactor under conditions sufficient to produce a $CO_2$ hydrate slurry and a $CO_2$ depleted multicomponent gaseous stream. The reactor is cooled with an ammonia coolant which vaporizes in the cooling process. The ammonia vapor is further compressed and the ammonia flows to a condenser or a $CO_2$ clathrate heat exchanger. The $CO_2$ hydrate slurry and other gases are then separated in the slurry/gas separator. The slurry is then sent to the $CO_2$ clathrate heat exchanger where the slurry is thermally treated to produce $CO_2$ gas and nucleated water and condensed ammonia liquid. Preferably, the compressed ammonia vapor produced from cooling the $CO_2$ hydrate reactor is used to thermally treat, at least in part, the $CO_2$ hydrate slurry in the heat exchanger, as this greatly reduces parasitic energy loss. The resultant $CO_2$ nucleated water is then chilled, e.g. using cooled amonia, and returned to the nucleation reactor, where it is combined with chilled makeup water and/or a recycled stream of pure $CO_2$ (which may be produced from the heat exchanger exhaust $CO_2$) to make $CO_2$ nucleated water of sufficiently high $CO_2$ content to selectively remove $CO_2$ from additional multicomponent gas. The $CO_2$ gas produced from the heat exchanger can be disposed of, e.g. by deposition in the deep ocean or ground aquifers or used in subsequent processes, e.g. enhanced oil recovery or coal bead methane recovery. By cycling the coolant medium (ammonia) between the heat exchanger and at least one of the cooling coils of the nucleation and hydrate formation reactors and recycling the nucleated water produced in the $CO_2$ clathrate heat exchanger, parasitic energy losses and resource use are minimized.

Figure 4:
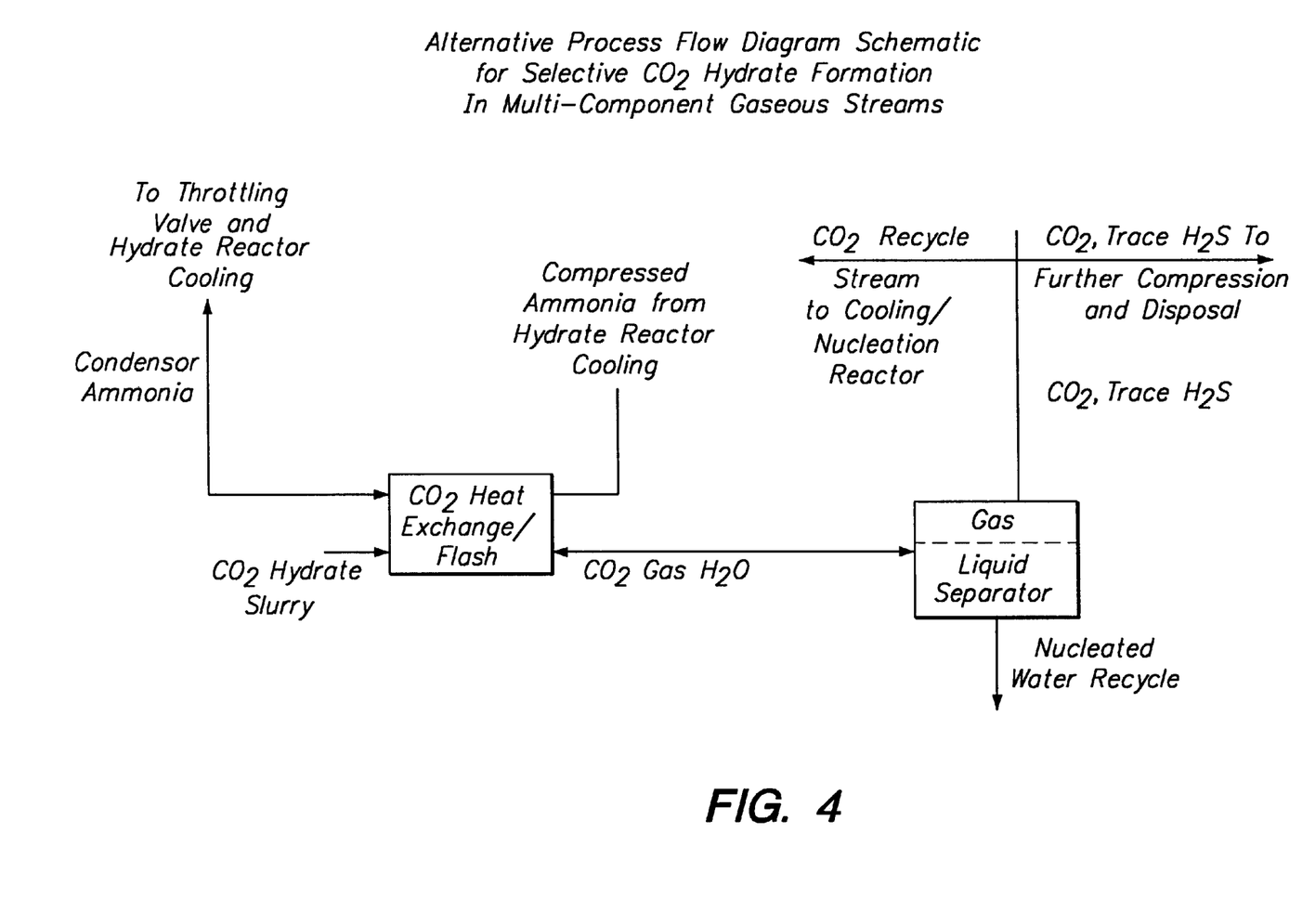
FIG. 4 provides a more detailed flow diagram schematic of the $CO_2$ clathrate slurry heat exchanger of the preferred embodiment represented in FIG. 3.

FIG. 4 provides a detailed schematic flow diagram of the $CO_2$ heat exchange component of the process depicted in FIG. 3.

The following examples are offered by way of illustration and not by way of limitation.

EXPERIMENTAL

The following experiments demonstrate the viability of reducing the $CO_2$ content of multicomponent gaseous streams by directly contacting the streams with $CO_2$ nucleated water under conditions of selective $CO_2$ clathrate formation. The following gaseous streams are representative of multicomponent gases suitable for treatment with the subject methods.

| Gas Stream | Initial Temp. (° C.) | Initial Pressure (ATM, gauge) | Components | Approximate $CO_2$ Mole Fraction |
|---|---|---|---|---|
| Power Plant Flue Gas | 80–150 | 0.1–0.2 | $N_2$, $O_2$, $H_2O$, $CO_2$, & Trace Gases | 0.10–0.15 |
| Turbo Charged Boiler | 80–150 | 10–20 | $N_2$, $O_2$, $H_2O$, $CO_2$, & Trace Gases | 0.10–0.15 |
| Coal Gasification Product Gas | 20–30 | 20–40 | $H_2$, CO, $H_2O$, $CO_2$, & Trace Gases | 0.02–.12 |
| Shifted Coal Gasification Product Gas | 20–30 | 20–40 | $H_2$, $H_2O$, $CO_2$, & Trace Gases | 0.30–0.45 |
| Anaerobic Digester Product Gas | 20–40 | 0–0.2 | $CH_4$, $CO_2$ | 0.40–0.50 |
| Wellhead Natural Gas | 20–100 | 50–80 | $CH_4$, $CO_2$, Higher Hydrocarbons | 0.03–0.90 |
| Fossil Fuel Combustion with Pure Oxygen | 80–150 | 0.1–0.2 | $CO_2$ & Trace Gases | 90–99 |

I. Power Plant Flue Gas

Flue gas from a conventional coal fired boiler is processed to remove sulfur oxides, some of the nitrogen oxides and any particulate matter. The processed flue gas is then compressed to approximately 20–50 atm. The flue gas is then contacted with $CO_2$ in the counter current reactor shown in FIG. 1, where the temperature in the reactor is maintained at 0.5° C. and the pressure is maintained at approximately 20–50 atm.

The flue gas is scrubbed to form a slurry of $CO_2$ clathrates and $CO_2$ free gas. The $CO_2$ free gas, comprising $N_2$, $O_2$, $H_2O$ and trace gases is then separated from the $CO_2$ clathrate slurry, and reheated to the required stack gas exhaust temperature. The $CO_2$ clathrate slurry is sequestered through deposition in the deep ocean or other appropriate repository. Since modest pressure levels (20–50 atm) are maintained in the reactor, minimal amounts of nitrogen or oxygen clathrates form during the process.

II. Turbo Charged Boiler Emission Gas

Coal is combusted in a turbo charged boiler. The exhaust gas, containing nitrogen ($N_2$), oxygen ($O_2$), water vapor, carbon dioxide and trace gases is cooled to 0° C. The cooled, clean exhaust gas is then further compressed to 20 to 50 atm and contacted with $CO_2$ nucleated water in the reactor shown in FIG. 1. The pressure inside the reactor is approximately 20 to 50 atm while the temperature is maintained at 0° C. Contact in the reactor results in the production of $CO_2$ free gas and a slurry comprising $CO_2$ clathrates. The $CO_2$ free exhaust gas stream is then reheated using a recuperative heat exchanger expanded through an expansion turbine and exhausted to the atmosphere. The $CO_2$ clathrate slurry is sequestered through deposition in the deep ocean or other appropriate repository.

Since the reactor conditions are controlled to 20 to 50 atm, very little nitrogen or oxygen clathrates are formed.

III. Coal Gasification Product Gas

Syngas is produced through gasification of coal with nearly pure oxygen. The resultant syngas comprises hydrogen, carbon monoxide, water vapor, carbon dioxide, and trace gases. Following removal of the trace gases, the syngas (which is at 20 to 40 atm) is cooled to 0° C. and contacted with $CO_2$ nucleated water in the countercurrent reactor shown in FIG. 1. Contact of the syngas with the $CO_2$ nucleated water results in the production of a slurry of $CO_2$ clathrates and a $CO_2$ free syngas, which are then separated. The resultant $CO_2$ free syngas may be utilized as a chemical feedstock or fuel.

IV. Steam Shifted Coal Gasification Product Gas

Prior to contact with $CO_2$ nucleated water, synthesis gas produced in accordance with Example III above is steam shifted to produce a gas consisting essentially of $CO_2$ and $H_2$. The shifted gas is then contacted with $CO_2$ nucleated water in the countercurrent reactor shown in FIG. 1, where the system pressure is 20 to 50 atm and the temperature is 0° C. Contact between the shifted synthesis gas and the $CO_2$ nucleated water results in the fixation of essentially 100% of the $CO_2$ component of the shifted synthesis gas as $CO_2$ clathrates, since the hydrogen does not form stable clathrates. The resultant slurry comprising the $CO_2$ clathrates is then sequestered by deposition in the deep ocean or other appropriate repository. The treated syngas is an essentially pure hydrogen stream which is further used in power production, as refinery hydrogen or in chemical synthesis.

V. Anaerobic Digester Product Gas

Product gas comprising 50–60% $CH_4$ and 50–40% $CO_2$, as well as certain trace gases such as ammonia and hydrogen sulfide, is obtained from the anaerobic digestion of sewage sludge, wastes, mircoalgae or macroalgae. The product gas is at atmospheric pressure.

The product gas is compressed to approximately 10–30 atm and combined with $CO_2$ nucleated water in the countercurrent reactor shown in FIG. 1. The pressure in the reactor is approximately 10–30 atm and the temperature is 0° C. Contact between the product gas and the $CO_2$ nucleated water results in fixation of 100% of the $CO_2$ of the product gas as clathrates, leaving an essentially pure methane stream. The $CO_2$ clathrate comprising slurry is deposited in the ocean or other appropriate repository, as described above, while the pure methane stream is condensed to produce liquefied natural gas.

VI. Wellhead Natural Gas

Wellhead natural gas comprising $CH_4$ and $CO_2$, where the amount of $CO_2$ exceeds 50% is processed directly at the wellhead. The wellhead natural gas is at 60 to 80 atm and 0–5° C.

The well head natural gas is processed in the reactor shown in FIG. 3. Contact between the wellhead natural gas and the $CO_2$ nucleated water results in fixation of 100% of the $CO_2$ of the product gas as clathrates, leaving an essentially pure methane stream. The $CO_2$ clathrate comprising slurry is deposited in the ocean or other appropriate repository, as described above, while the pure methane stream is routed to a pipeline for distribution.

For wellhead natural gas in which the partial pressure of $CO_2$ is between 15 and 50%, the gas stream is first decompressed prior to processing in the reactor of FIG. 3. In decompressing the gas stream, the partial pressure of $CO_2$ is engineered to be above 10 atm while the partial pressure of $CH_4$ is engineered to be below 20 atm. The temperature is maintained at 0 to 5° C. To keep parasitic energy loss to a minimum, the gas stream may be decompressed in an expansion turbine and the energy generated therefrom used to recompress the product methane gas.

To process the gas according to the subject invention in which the partial pressure of $CO_2$ in the gas is less than 15%, the characteristics of the nucleated water are selected to provide for optimal selective absorption of $CO_2$ over other hydrocarbons present in the wellhead natural gas. For example, hydrates could be introduced into the nucleated water prior to contact, promoting selective absorption of $CO_2$ from the wellhead gas.

VII. Gas Produced By Combustion of Fossil Fuel with Pure Oxygen

Fossil fuel is combusted using pure oxygen. The resultant flue gas comprises $CO_2$ and trace gases, and has an initial pressure of 0.1 to 0.2 atm.

The flue gas is compressed to 4 to 20 atm and then processed in the reactor shown in FIG. 3. Following $CO_2$ extraction, the nearly pure $CO_2$ hydrate slurry is pressurized to 100 to 150 atm in a reciprocating charge pump or comparable pump system. The high pressure stream is then flashed to free the high pressure $CO_2$ for transport to the deep ocean or ground aquifers or to be utilized for coal bed methane recovery or enhanced oil recovery.

VIII. Concurrent Reactor

Each of the above treatments in Examples I through V are carried out in a concurrent reactor as shown in FIG. 2.

It is evident from the above results that a simple and efficient method for the selective removal of $CO_2$ from a multicomponent gaseous stream is provided. By using $CO_2$ nucleated water as a selective $CO_2$ absorbent, great efficiencies are achieved through reductions in the overall energy input requirements and the number of steps necessary for complete $CO_2$ removal, fixation and disposal. In particular, by using $CO_2$ nucleated water as the absorbent solvent, $CO_2$ is readily removed from the gaseous stream and immediately fixed in a form suitable for disposal. By treating the resultant $CO_2$ hydrate slurry to produce $CO_2$ gas and nucleated water, even further reductions in parasitic energy loss are obtained, where such reductions stem from the use of recycled nucleated water, recycled coolant medium, e.g. amonia, and the like.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A method for removing $CO_2$ from a multicomponent gaseous stream to produce a $CO_2$ depleted gaseous stream, said method comprising:

contacting said multicomponent gaseous stream with $CO_2$ nucleated water comprising water produced by decomposition of a $CO_2$ clathrate slurry under conditions of $CO_2$ clathrate formation, whereby $CO_2$ is absorbed from said gaseous stream by said $CO_2$ nucleated water and concomitantly fixed as $CO_2$ clathrates upon said contacting, whereby a $CO_2$ depleted gaseous stream and a $CO_2$ clathrate slurry are produced;

separating said $CO_2$ depleted gaseous stream from said $CO_2$ clathrate slurry; and decomposing said $CO_2$ clathrate slurry to produce $CO_2$ gas and $CO_2$ nucleated water.

2. The method according to claim 1, wherein said multicomponent gaseous stream has a $CO_2$ partial pressure of at least about 5 atm.

3. The method according to claim 1, wherein said $CO_2$ clathrate decomposition step comprises heating said $CO_2$ clathrate slurry.

4. A method for selectively removing $CO_2$ from a multicomponent gaseous stream to produce a $CO_2$ depleted gaseous stream, said method comprising:

preparing $CO_2$ nucleated water by contacting $CO_2$ gas with water in a nucleation reactor;

contacting said multicomponent gaseous stream with said $CO_2$ nucleated water in a $CO_2$ hydrate formation reactor under conditions of selective $CO_2$ clathrate formation, whereby $CO_2$ is absorbed from said gaseous stream by said $CO_2$ nucleated water and concomitantly fixed as $CO_2$ clathrates upon said contacting, whereby a $CO_2$ depleted gaseous stream and a $CO_2$ clathrate slurry are produced;

separating said $CO_2$ depleted gaseous stream from said $CO_2$ clathrate slurry; and heating said $CO_2$ clathrate slurry in a manner sufficient to produce $CO_2$ gas and $CO_2$ nucleated water.

5. The method according to claim 4, wherein said $CO_2$ nucleated water production step comprises combining $CO_2$ nucleated water produced by heating said $CO_2$ clathrate slurry with additional make up water and $CO_2$ gas.

6. The method according to claim 4, wherein at least one of said nucleation reactor and hydrate production reactor are cooled with ammonia at a temperature of from about 0 to 10° C.

7. The method according to claim 4, wherein said heating step comprises processing said $CO_2$ clathrate slurry in a heat exchanger with ammonia at a temperature of from about 20 to 40° C.

8. The method according to claim 7, wherein said multicomponent gaseous stream is selected from the group of multicomponent gaseous streams consisting of natural gas, power plant flue gas, turbo charged boiler emission gas, coal gasification product gas, shifted coal gasification product gas, anaerobic digester product gas, wellhead natural gas and flue gas produced through combustion of fossil fuel with pure oxygen.

9. The method according to claim 4, wherein said hydrate formation reactor comprises from 1 to 20 multicomponent gas injectors.

10. A method for selectively removing $CO_2$ from a multicomponent gaseous stream to produce a $CO_2$ depleted gaseous stream, said method comprising:

preparing $CO_2$ nucleated water by contacting $CO_2$ gas with water in a nucleation reactor, wherein said $CO_2$ nucleated water is prepared by combining recycled nucleated water with $CO_2$ gas and make up water and said reactor is cooled with a cooling means comprising ammonia at a temperature of from 0 to 10° C.;

contacting said multicomponent gaseous stream with said $CO_2$ nucleated water in a $CO_2$ hydrate formation reactor under conditions of selective $CO_2$ clathrate formation, wherein said contact is achieved by injecting said multicomponent gaseous stream into said reactor through 1 to 20 injectors, whereby $CO_2$ is absorbed from said gaseous stream by said $CO_2$ nucleated water and concomitantly fixed as $CO_2$ clathrates upon said contacting, whereby a $CO_2$ depleted gaseous stream and a $CO_2$ clathrate slurry are produced;

separating said $CO_2$ depleted gaseous stream from said $CO_2$ clathrate slurry; and decomposing said $CO_2$ clathrate slurry in a heat exchanger in a manner sufficient to produce $CO_2$ gas and $CO_2$ nucleated water.

11. The method according to claim 10, wherein said heat exchanger comprises ammonia at a temperature of from about 20 to 40° C.

* * * * *